United States Patent
Christy

[15] 3,637,112
[45] Jan. 25, 1972

[54] MACHINE FOR DISPENSING AND DISTRIBUTING DRY FLOWABLE MATERIALS

[72] Inventor: Daniel Lamar Christy, R.F.D. 5, Fremont, Ohio 43420

[22] Filed: Apr. 26, 1967

[21] Appl. No.: 641,725

[52] U.S. Cl. .......................... 222/317, 222/342, 222/414, 318/DIG. 1
[51] Int. Cl. ........................................................ G01f 11/20
[58] Field of Search .................. 222/224, 281, 290, 342, 414, 222/272, 317; 118/308, DIG. 1

[56] References Cited

UNITED STATES PATENTS

| | | | |
|---|---|---|---|
| Re. 20,660 | 2/1938 | Schacht | 118/308 |
| 282,720 | 8/1883 | Gunckel | 222/281 X |
| 1,777,661 | 10/1930 | Dellenbarger | 222/281 X |
| 2,738,713 | 3/1956 | Buczkowski et al. | 118/308 X |
| 2,740,725 | 4/1956 | Ball | 118/308 X |
| 2,865,536 | 12/1958 | Price | 222/414 X |
| 257,951 | 5/1882 | Keller | 222/317 X |
| 1,855,214 | 4/1932 | Alton | 222/272 X |

Primary Examiner—Robert B. Reeves
Assistant Examiner—Frederick R. Handren
Attorney—Oberlin, Maky, Donnelly & Renner

[57] ABSTRACT

A machine for dispensing and distributing dry flowable materials including a pair of horizontally disposed parallel rolls having one of their sides in contact with each other, and a hopper having a bottom outlet vertically above the contacting sides of the rolls for discharge of material onto the rolls. The rolls are rotated in a direction causing the material to be carried upwardly by one of the rolls for discharge from the other side.

8 Claims, 3 Drawing Figures

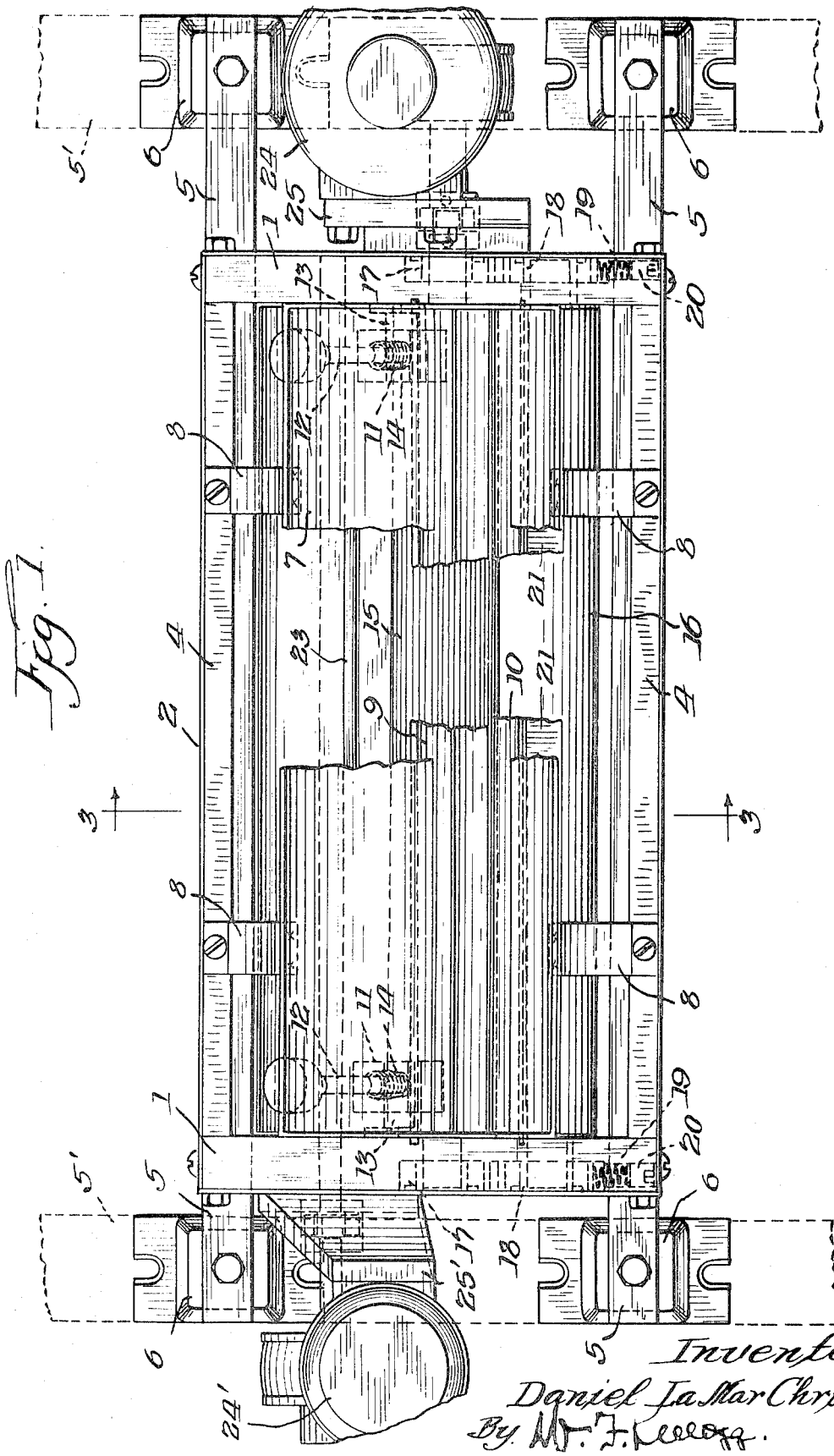

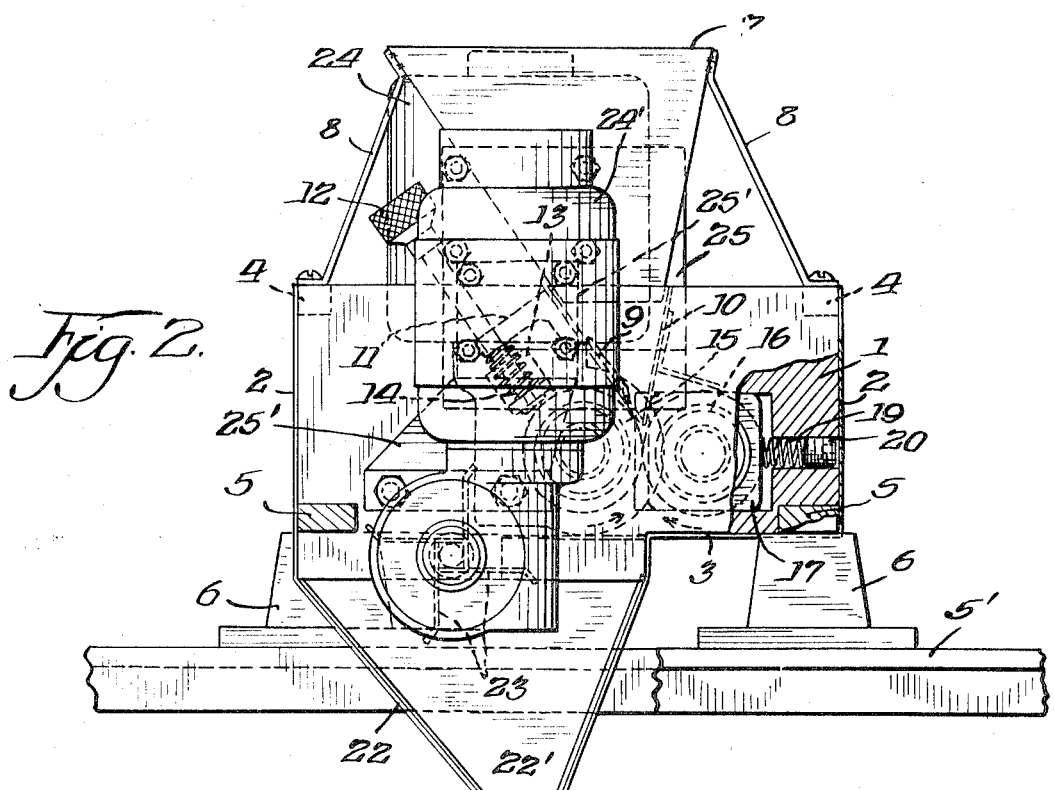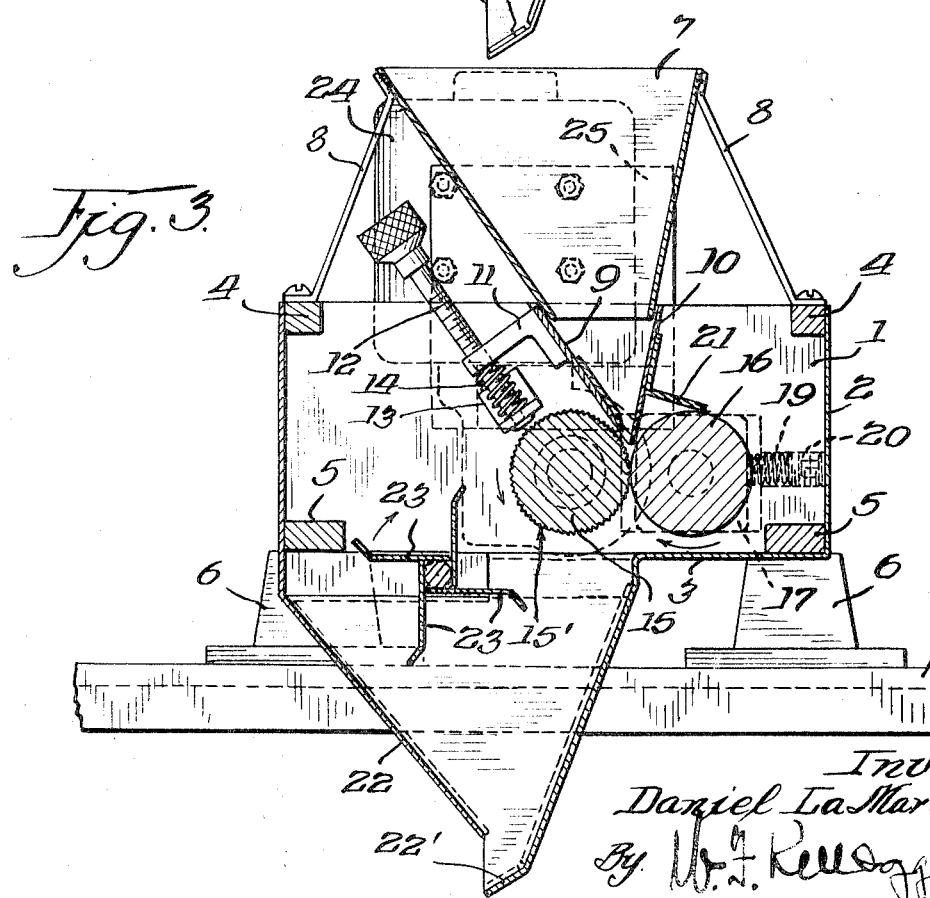

MACHINE FOR DISPENSING AND DISTRIBUTING DRY FLOWABLE MATERIALS

This invention relates to improvements in machines for effecting the controlled discharge, by sprinkling or dispersion, of various forms of flowable dry, or substantially dry, edible or nonedible matters onto edible or nonedible products, such for example, though in no manner so limited, as the evenly scattered discharge of salt, sugar, edible seeds or other taste-improving, garnishing or decorative matters onto biscuits, crackers, potato and other edible chips, pretzels, rolls, and other bakery or edible products, or nonedible appearance-embellishing and/or utilitarian materials or matters onto nonedible products; and machine being of that general type as described and claimed in my U.S. Pat. Nos. 3,070,264 and 3,073,607.

A principal object of the invention resides in the provision of a machine of such construction that granular, powdered, flaked or similar materials supplied thereto will be delivered in a selectively regulated flow to a dispensing roll, received on and carried by its peripheral surface in measured or predetermined amounts and discharged therefrom in scattered substantially even and uniform fashion and form for deposit on a receiving body.

An equally important object of the invention is to provide to the machine dispensing roll or rolls a means operating in conjunction therewith whereby material delivered thereonto will be evenly distributed over the prepared peripheral surface or surfaces thereof and retained thereon against spillage or waste until it reaches a point in or of rotation where it will be discharged therefrom.

A further object of the invention is to provide to the machine novel and effective means for causing a final and thorough dispersion or spreading of the dispensing roll discharged matter and impelling its downward flow in dispersed form to and from the machine discharge onto a receiving body or product therebelow, hence, assuring an even and substantially uniform coverage of its receiving surface or surfaces.

Another equally important object of the invention resides in providing a machine of the above-stated character which, in operation, will effect a measured and uniformly spread cascadelike discharge of comminuted, granulated, powdered, flaked, or otherwise divided edible or nonedible materials onto a receiving body (edible or nonedible) with but a minimum of waste, if any, and at the same time, with an effective surface coverage.

Yet another object of the invention is to provide the material receiving and discharge roll or rolls of the machine with novel and highly advantageous mounting, being such that rotation impeding accumulations or encrustations of the material being dispensed thereby, on and about both the roll ends and its or their journals or mountings, will be materially reduced, if not prevented. Thereby, detrimental frictional drag resulting in damage will be substantially prevented; moreover, as regards sanitation requirements for food processing machinery, cleanliness or the overall sanitary character of the machine will be maintained and assured, in that should there be residual materials, they may be easily and effectively removed.

These and other objects of the invention will become apparent from the following description when read in conjunction with the appended claims and accompanying drawings.

In the drawings:

FIG. 1 is a top plan view of the machine with portions of the dispensing roll and cooperating roll driving motors and hopper broken away.

FIG. 2 is an end elevation thereof with a portion of the same broken away and shown in section to illustrate the spring pressed sliding mounting of the cooperating roll bearings.

FIG. 3 is a vertical transverse section taken on the line 3—3 of FIG. 1, looking in the direction in which the arrows point.

Referring in detail to the form of my invention shown in FIGS. 1, 2 and 3 of the drawings, the invention, generally, comprises a substantially rectangularly shaped body including end, sidewalls, and bottom, respectively indicated by the reference numerals, 1, 2 and 3, the end walls being of thickness and strength to effectively mount and support its working parts or components, and the sidewalls and bottom being of less thickness, secured to and carried by longitudinally disposed bars 4 fixedly mounted in the upper corner portions of the end walls, as shown in FIG. 3.

Barlike body support rails 5, each equipped with feet 6, are seated in the lower corner portions of the end walls and serve to support the machine body, said feet being bearingly engaged with the relatively spaced transversely disposed bars or rails 5' of a suitable receiving and supporting frame, not shown.

A hopper 7 is received in and longitudinally of the open upper end of the machine body, being fixedly secured to and supported by and between legs 8 mounted on the end wall supported bars 4. Its lower and open end is nestingly engaged between downwardly converging chute plates 9 and 10, the former being a substantially vertically adjustable (adjustable upwardly and downwardly), as presently described, to control the density or rate of flow of a dispensed material, and the latter being endwise seated in adjacent inner side portions of the end walls 1. Longitudinally spaced brackets 11 are fixed to and carried by the plate 9 and threadedly engaged by adjusting screws 12 rotatively engaged with and supported by other angle brackets 13, fixedly mounted on the inner side portion of the walls 1. Coiled springs 14 are engaged over the lower end portions of each of the adjusting screws in bearing engagement with adjacent portions of the angle brackets 11 and 13 whereby to exert drag influence on their respective screws, preventing too free rotation thereof following their turning to adjusted positions. Thus, with rotation of said screws in preselected directions, the plate 9 will be raised or lowered and in so doing, will either increase or decrease the density or size of the material or matter flow discharge opening between said plates 9 and 10.

To effect a dispersed or scattered discharge of granular or similar material from the hopper 7 and the chute plates 9 and 10, a pair or relatively adjacent and parallel metal rolls 15 and 16 are mounted in the disposed longitudinally of the machine body in communicative relation to and with the lower ends of said plates, as shown in FIG. 3 of the drawings. The roll 15 has longitudinally disposed equisized corrugations 15' formed in and over its entire peripheral surface serving to receive, carry and dispense the material with rotation thereof, while the roll 16 is formed with a smooth peripheral surface. The opposite ends of the rolls and journaled in bearings 17 and 18 mounted in the body end walls (see FIGS. 1 and 2); the bearings 17 being horizontally slideable in chambers or pockets provided therefor and normally thrust inwardly by coiled springs 19 seated in communicating pockets and engaged by tension adjusting screws 20. Thereby, the roll 16 will be maintained in constant though yielding frictional peripheral contact with the roll 15 in order that material flowed thereonto from the chute plates 9–10 will be retained in the receiving corrugations 15' during its counterclockwise rotation until outwardly and downwardly discharged therefrom.

Rotary driving of the roll 15 at a desired or required r.p.m. is effected by a suitable electric motor 24 mounted on a machine body end wall attached supporting plate 25. The adjacent shaft end of the roll is extended through and beyond its end wall bearing and drivenly connected to the motor motion transmitting gearing (not shown).

To maintain the smooth peripheral surface of the roll 16 free of adhering flowed material, it is preferable that a scraper plate 21 be mounted on an appropriate portion of the outer side of the plate 10 for engagement therewith throughout its length.

A flow and roll discharged material receiving and dispensing hopperlike chute 22 is provided on the body bottom 3 (see FIGS. 2 and 3) below the dispensing roll 15. The lower end thereof is formed with a laterally directed discharge way, the lower side or lip of which is angled, as at 22' in a manner to deflect flowed material impinging thereupon outwardly and downwardly whereby it will be thoroughly dispersed or spread in its downward passage to and onto receiving bodies therebelow, thus effectively and evenly coat the same.

If desired, a rotary bladed impeller 23 may be mounted in and longitudinally of and throughout the length of the hopperlike chute 22 below the dispensing roll 15, being journaled in bearings in the machine body end walls 1 with one of its shaft ends extended through the adjacent end wall and drivenly connected to the motion transmission gearing (not shown) of an electric motor 24' mounted on a machine body end wall attached supporting plate 25'. With rotation of the impeller at a preselected r.p.m., material discharged from the dispensing roll 15 will be contacted by the impeller blades, further dispersed and driven downwardly, whereupon it will impinge upon the walls of the hopperlike chute 22 and be thoroughly dispersed or scattered for cascade discharge therefrom.

In operation of the form of machine shown in FIGS. 1, 2 and 3, assuming it is employed to dispense seasoning onto potato chips, salt of the required mesh, is supplied to the hopper. The size of the hopper discharge way is adjusted to control the rate of lateral and outward outflow of salt therethrough by moving the chute plate or density flow plate 9 upwardly or downwardly through turning of the adjusting screws 12 in the proper direction. The roll 15 is rotated in a counterclockwise direction by its motor 24 at the required velocity, causing the frictionally contacted roll 16 to be rotated in an opposite or clockwise direction. The laterally and outwardly spilling or flowed salt will be received by the roll 15, carried upwardly and outwardly and then downwardly discharged therefrom into the hopperlike chute 22. Thus, it will be seen that the salt will be delivered indirectly to the roll instead of being discharged directly downwardly thereonto. Thereby impacting of the salt will be prevented. In the event that the impeller 23 is provided to the machine, the downwardly discharged or dispensed salt will be contacted by its rotating blades, thoroughly dispersed and driven downwardly, impinging upon the inclined walls of the hopperlike chute 22 and its deflecting lip 22' from where it will be dispensed from the machine in cloudlike form, for depositing onto potato chips moving therebelow.

The amount or extent of salt seasoning of the potato chips may be varied by the aforedescribed adjustment of the chute plate 9.

In operation of the machine without the rotary impeller 23, the scattered or dispersed dispensing of salt will be effected by its spread discharge from the dispensing roll 15 and its downward tortuous travel and impingement upon the hopperlike chute walls and the deflector lip 22'.

From the foregoing description of my invention, it is apparent that an important and essential characteristic or feature thereof resides in the manner or method of delivering the salt, or other divided materials, to the dispensing roll of the machine. It is supplied from the machine hopper to and between the plates 9, 10, and thereupon outflowed therefrom in selectively metered quantity to the rolls 15, 16. By reason of the lateral outflowing of the unimpacted or loosely lying salt or other dry flowable material, via the level seeking and maintained feed or supply thereof from the reservoir between said plates, a dependably constant and uniform delivery and sprinkling onto the receiving products is assured. As the loose salt or other dry flowable material is discharged from the lateral and outward outlet provided by the metering discharge way between the plates, the supply thereof is constantly maintained. The receiving roll, rotating at a preselected speed, acts to displace the outflowing salt or other dry flowable material and convey it upwardly thereover from whence it is discharged in cascadelike form onto receiving products. It is here noted and emphasized that the roll 15 does not pick up the salt from the plates near or at the bottom; rather, once the flow of the salt reaches a level between the plate discharge way and the upper portion of the roll, it freely spills over onto the roll and is carried upwardly thereby for the ultimate cascadelike discharge therefrom.

It will be understood that the dispensing roll 15, may, if desired or required, be replaced by other and similar rolls whose peripheral surfaces are plain, smooth, indented or formed or provided with corrugations or pockets of different forms and sizes dependent upon the character and kind of materials which are to be dispensed by the machine.

It will also be understood that whereas I have described the usage of the machine for dispensing edible matters, i.e., certain herein named products, its use is in no manner limited to such. The machine, obviously, may be employed equally advantageously for dispensing, coating and/or sprinkling nonedible matters or materials onto nonedible bodies or products.

Furthermore, it is to be understood that my improved machine may be constructed in different widths whereby to increase the output or discharge of flowable edible and/or nonedible matters therefrom also, that two or more of said machines may be arranged in endwise relation in order to increase the width or output of flowable materials therefrom, or for that matter, the machines may be arranged, if desired, in relatively tandem relation to assure a satisfactory coating of edible or nonedible matters moving therebeneath.

I claim:

1. A machine for dispensing and distributing flowable particulated material onto and over a receiving body comprising a pair of horizontally disposed parallel rolls having one of their sides in contact with each other, a hopper for the material having a bottom outlet vertically above the contacting sides of said rolls for discharge of the material onto said rolls above such contacting sides, and means for rotating said rolls in a direction causing the material to be carried upwardly by one of said rolls for discharge from the other side of said one roll, the other roll having a smooth peripheral surface, and means for preventing material from adhering to said other roll, said last-mentioned means comprising a scraper plate engaging the peripheral surface of said other roll.

2. The machine of claim 1 wherein said one roll has corrugations thereon which assist in carrying the material upwardly by said one roll as aforesaid.

3. The machine of claim 1 further comprising adjustable spring means for urging said other roll into engagement with said one roll.

4. The machine of claim 1 further comprising a pair of relatively converging chute plates extending downwardly from said hopper in communication with said hopper outlet, said chute plates defining a discharge way therebetween vertically above the contacting sides of said rolls.

5. A machine for dispensing and distributing flowable particulated material onto and over a receiving body comprising a pair of horizontally disposed parallel rolls having one of their sides in contact with each other, a hopper for the material having a bottom outlet vertically above the contacting sides of said rolls for discharge of the material onto said rolls above such contacting sides, and means for rotating said rolls in a direction causing the material to be carried upwardly by one of said rolls for discharge from the side of said one roll, a pair of relatively converging chute plates extending downwardly from said hopper in communication with said hopper outlet, said chute plates defining a discharge way therebetween vertically above the contacting sides of said rolls, and means for adjusting the position of one of said chute plates with respect to the other chute plate for varying the size of said discharge way.

6. The machine of claim 5 wherein said last-mentioned means comprises a stationary bracket, an adjusting screw rotatably supported by said stationary bracket, a movable bracket carried by said one chute plate, said adjusting screw having threaded engagement with said movable bracket whereby rotation of said adjusting screw causes movement of said one chute plate toward and away from said other chute plate, and spring means surrounding said adjusting screw between said brackets which provides a resistance to turning of said adjusting screw.

7. A machine for dispensing and distributing flowable particulated material onto and over a receiving body comprising a pair of horizontally disposed parallel rolls having one of their sides in contact with each other, a hopper for the material having a bottom outlet vertically above the contacting sides of said rolls for discharge of the material onto said rolls above such contacting sides, and means for rotating said rolls in a direction causing the material to be carried upwardly by one of said rolls for discharge from the other side of said one roll, and a discharge chute below said one roll for receipt of the material discharge from the other side of said one roll, said discharge chute having an angled lip at the lower end thereof for dispersing the material discharge.

8. The machine of claim 7 further comprising a rotary impeller in said discharge chute below said one roll, and means for rotating said impeller for further dispersing of the material discharge.

* * * * *